March 9, 1948. H. KLAUCKE 2,437,540
VARIABLE SPEED TRANSMISSIONS
Filed June 26, 1944 2 Sheets-Sheet 1

Inventor
Hermann Klaucke,
By J.B.Collings
Attorney

March 9, 1948.　　　H. KLAUCKE　　　2,437,540
VARIABLE SPEED TRANSMISSIONS
Filed June 26, 1944　　　2 Sheets-Sheet 2
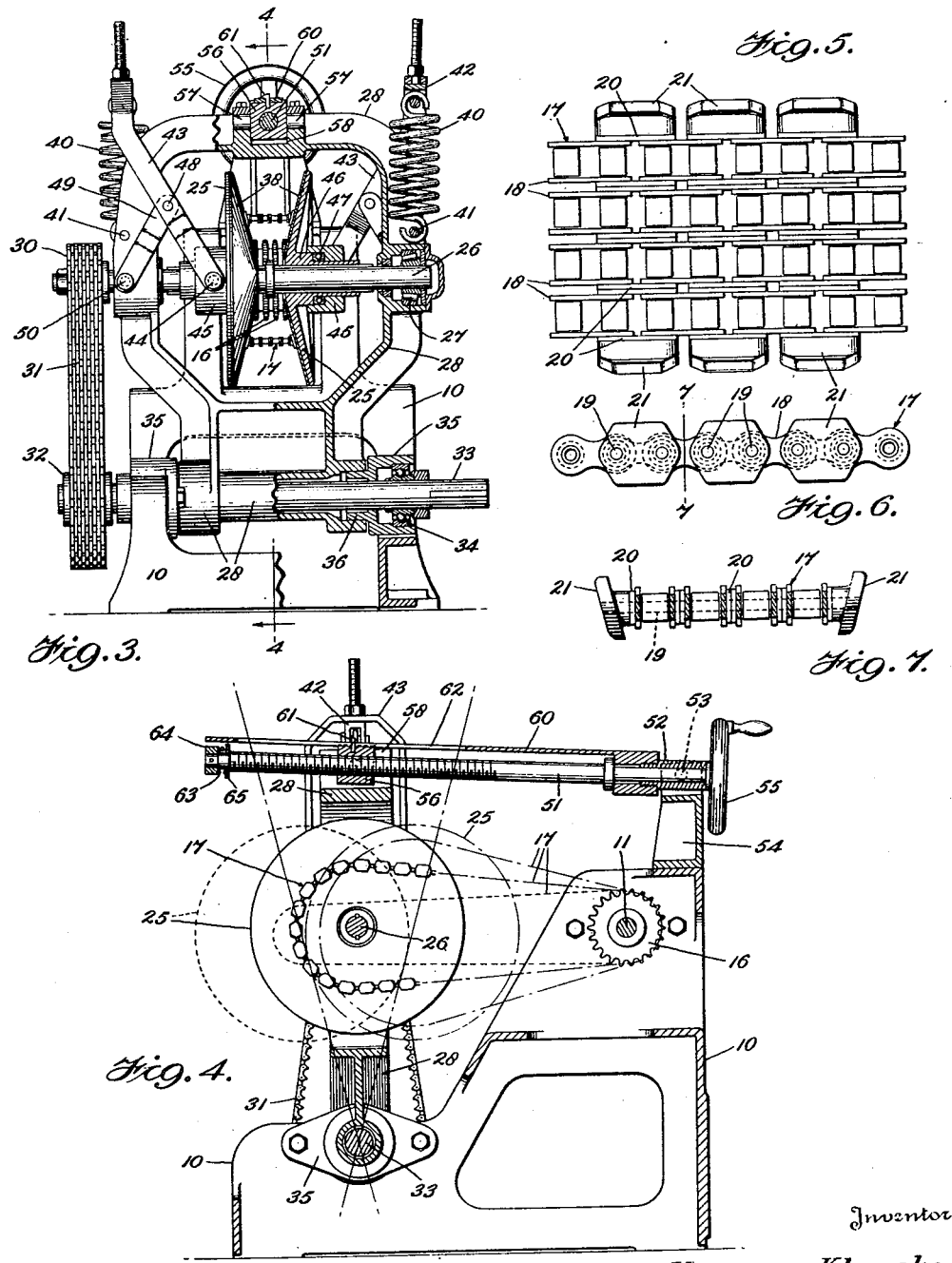
Inventor
Hermann Klaucke, Patented Mar. 9, 1948

2,437,540

UNITED STATES PATENT OFFICE 2,437,540

VARIABLE-SPEED TRANSMISSION

Hermann Klaucke, Worcester, Mass., assignor to Chain Belt Company, Milwaukee, Wis., a corporation of Wisconsin Application June 26, 1944, Serial No. 542,113

4 Claims. (Cl. 74—230.17)

The invention relates to variable speed power-transmitting apparatus, and has for one of its objects the provision of a simplified and improved mechanism of the type employing an expansible pulley and a drive belt associated therewith, and in which, within the limits of the device, an infinite number of ratios between the speeds of the input and output shafts may be obtained.

A further object of the invention is to provide a transmission of the class described in which the drive belt is maintained under substantially uniform tension at all speeds, slippage is minimized, and elongation of the belt due to wear automatically compensated, all without the use of a belt tightening idler.

A still further object of the invention is to provide an improved expansible pulley arrangement for apparatus of this character, wherein the pulley elements are controlled by spring devices and connections adapted to exert substantially uniform force upon the said elements throughout the range of action.

For purposes of disclosure one form of apparatus constructed in accordance with the invention and capable of attaining the above and other objects which may hereinafter appear, is illustrated in the accompanying drawings forming a part of this specification, in which:

Fig. 3 is an end elevational view, as seen from the left of Fig. 2, partly broken away and in section on approximately the plane indicated by the line 3—3 of said Fig. 2;

Fig. 4 is a vertical longitudinal sectional view on approximately the plane indicated by the line 4—4 of Fig. 3, looking in the direction of the arrows;

Fig. 5 is a plan view of a small portion of the drive belt;

Fig. 6 is an elevational view of the parts shown in Fig. 5; and

Fig. 7 is a cross sectional view on the plane indicated by the line 7—7 of Fig. 6.

Figure 2:
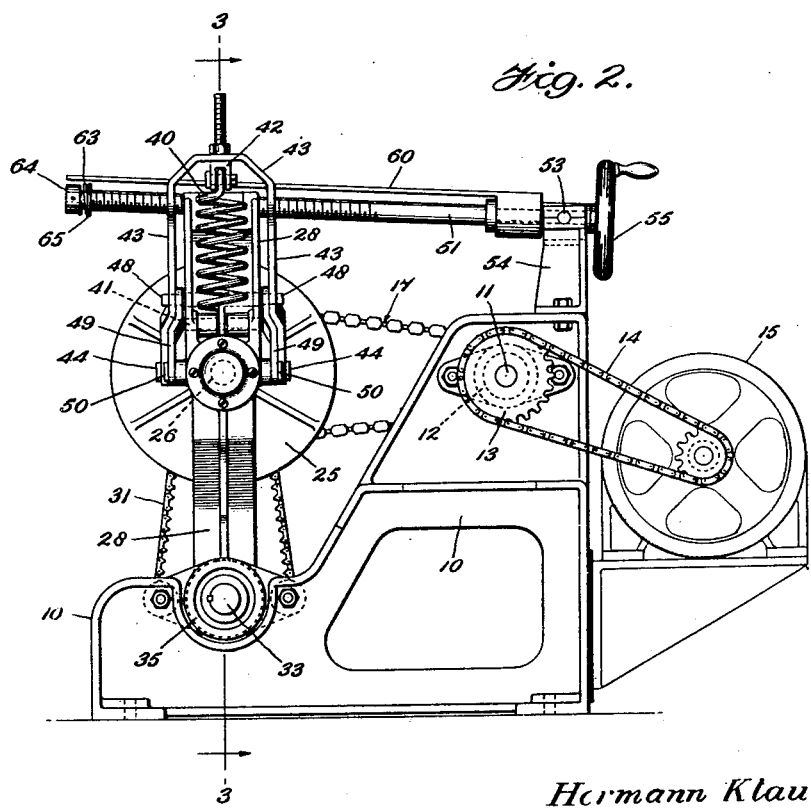
Fig. 2 is a side elevational view of the same.

Referring more particularly to said drawings, the machine comprises a frame 10 in which an input shaft 11 is journaled in suitable bearings 12, which shaft may be driven by a sprocket 13 and chain 14 from any appropriate source of power such for example as an electric motor 15 (Fig. 2). The shaft 11 carries a set of sprockets 16, see Figs. 3 and 4, engageable by the drive belt 17 which, as best shown in Figs. 5, 6 and 7, comprises a plurality of adjacent strands of roller chain 18 of more or less conventional construction except that the chain pins 19 are each extended somewhat beyond the sides of the belt and each pair of such pins carrying the pin links 20 of the chain has a metallic pad element 21 press-fitted upon the projecting pin ends, adjacent each of the outermost pin links.

The belt 17 extends to and is trained about an expansible pulley comprising a pair of opposed coniform members 25 which are splined to and axially movable upon a countershaft 26 journaled in bearings 27 carried by a yoke 28. The said countershaft carries a sprocket 30 engaged by a chain 31 which is also trained about a sprocket 32 carried by an output shaft 33 journaled in bearings 34 carried by housings 35 secured to the frame 10. The yoke 28 is journaled on hubs 36 formed on the bearing housings 35, whereby the said yoke may oscillate about the axis of the output shaft 33 and the distance between the axes of the shafts 26 and 33 maintained constant, as will be readily understood.

The operative surfaces of the cones 25 are provided with facings 38 of leather or similar material, for frictional engagement by the outer faces of the pads 21 of the belt 17. As above stated, the said cones are axially slidable on the countershaft 26, and they are constantly yieldably urged toward one another by coiled tension springs 40 anchored at one end to the yoke 28 by pins 41 and attached at their other ends by means of adjustable eyes 42 to the inverted U-shaped members 43, the lower ends of which are pivotally secured as at 44 to collars 45 which are associated with the hubs 46 of the cone members 25 with thrust bearings 47 interposed between them, see Fig. 3. To each arm of each of the U-shaped members 43, and at approximately the mid point of such arms, there is pivotally connected as at 48 one end of a link 49, the other ends of such links being pivoted as at 50 to the yoke structure 28. The pivots 50 are preferably in horizontal alinement with the pivots 44, and in substantially vertical alinement with the eyes 42, whereby the varying spring tension—which is approximately a linear function of elongation—is compensated for, with a resulting moment of force on the cones which is substantially constant irrespective of the amount of elongation of the springs 40. This linkage arrangement therefore equalizes the force exerted by the springs 40 tending to move the cones 25 toward one another throughout their range of movement, and provides a substantially uniform pressure of the cones upon the pads 21 of belt 17 which reduces wear on the latter and secures an ability to transmit power with substantially uniform efficiency at all speed ratios within the range of the apparatus.

Figure 1:
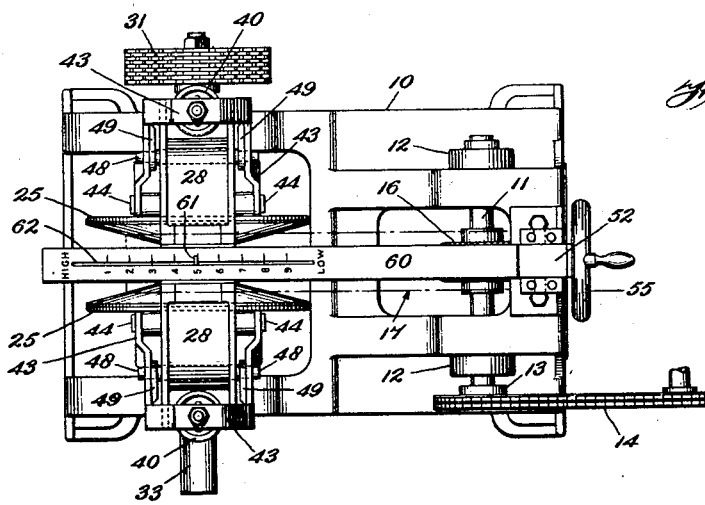
Figure 1 is a top plan view of such a machine.

For swinging the yoke 28 to secure various ratios, a threaded shaft 51 is provided, said shaft being journaled in a bearing 52 pivotally mounted by trunnions 53 in a bracket 54 carried by the frame 10. The shaft carries a hand wheel 55 by which it may be rotated, and the threads of said shaft are engaged by a nut 56 pivotally mounted by trunnions 57 in a recess 58 formed in the upper portion of the yoke 28. A scale plate 60 is carried by the bearing 52 and extends above the screw 51, which plate is provided with appropriate graduations and indicia as shown in Fig. 1, for co-operation with a finger or pointer 61 carried by the nut 56 and projecting through an elongated slot 62 in the plate, whereby the setting of the apparatus may be visibly indicated. At its outer end the threaded shaft 51 may carry a buffer device for engagement by the nut 56 at its outer limit of travel, said device being here shown as comprising a spring 63 interposed between a collar 64 fixed on the end of the shaft 51, and a washer 65 slidable thereon.

In the drawings the mechanism has been illustrated with the parts set at an intermediate position, but it will be readily understood that by rotating the screw 51 in one direction or the other, the nut 56 will be caused to travel along the said screw and the yoke 28 and the parts carried thereby thus swung about the axis of output shaft 33 toward or to either the dotted line or the broken line position of the cones 25 indicated in Fig. 4. Since the length of the belt 17 is fixed, movement of the parts toward the dotted line position, through wedging action of the belt upon the conical surfaces of members 25, will spread the cones outwardly against the action of the springs 40 and reduce the radius of the arc of engagement between the belt and the cones, thus increasing the speed at which the cones 25, countershaft 26 and output shaft 33 are rotated, relative to the speed of the input shaft 11. Conversely, upon movement of the parts toward the broken line position of Fig. 4 the springs 40 through the linkage 43, 49 will force the cones 25 toward one another, maintaining constant driving engagement between the pads of belt 17 and the cone faces and increasing the radius of the arc of contact between them, thereby decreasing the speed ratio. During such movements the linkage 43, 49 keeps the force applied by the springs to the cones substantially constant, even though the actual force exerted by the said springs may vary materially as they are extended and contracted. This uniform pressure is in turn transmitted by the cones to the belt 17, and the apparatus will thus transmit power at all speeds with substantially uniform efficiency.

It will be noted that the drive from input shaft 11 to output shaft 33 is positive at all points save only the engagement between the belt pads 21 and the cones 25, which thus constitute the only place where slippage may occur. As a result, the facings 38 of the cones 25 are the only elements subject to material wear, and these may be readily and cheaply replaced.

The chain strands 18 of course will be subject to slow wear, which will ultimately result in appreciable lengthening of the belt 17, but the spring pressed cones 25 will continuously automatically take up any resulting slackness in the belt which would otherwise increase slippage and wear. Thus, a separate idler or other similar belt tightener is unnecessary.

While one form of the invention has been illustrated and described, it will be obvious that those skilled in the art may vary the precise details of construction and arrangement of parts without departing from the spirit of the invention, and therefore it is not wished to be limited to the above description, except as may be required by the claims.

What is claimed is:

1. In a variable speed power-transmitting mechanism comprising a support, a drive belt, and an expansible pulley carried by the support and including a pair of opposed coniform members for receiving said belt between them, said members being movable toward and from one another to vary the effective diameter of the pulley: the combination of means constantly yieldably urging the coniform members toward one another, comprising a spring for each of said members having one of its ends anchored to said support; arms providing a connection between the other end of said springs and their respective pulley members; and links pivotally connected to the support and to said arms approximately medially between the ends of the latter, whereby the varying force exerted by the springs as they expand and contract will be transmitted as a substantially uniform force to the pulley members throughout their range of movement.

2. In a variable speed power-transmitting mechanism, the combination of an input shaft; an output shaft; a countershaft mounted for swinging movements about one of the two first named shafts; an expansible pulley carried by said countershaft; a drive belt frictionally engaging said pulley and having positive drive connections with the other of the two first named shafts; positive drive connections between said other shaft and the countershaft; resilient means for causing said pulley to maintain frictional engagement with the drive belt throughout the operative range of the pulley, the force exerted by said resilient means varying throughout said range; means for swinging said countershaft and pulley to vary the effective diameter of the latter; and means for causing the varying force exerted by the resilient means to be applied to the pulley as a substantially constant force throughout the various positions assumed by the pulley.

3. In a variable speed power-transmitting mechanism, a non-rotatable support; an expansible pulley journalled in said support, said pulley including an axially reciprocal conical member operable to vary the effective diameter of the pulley; a belt engaging said pulley; means for moving said pulley member in one direction and yieldably resisting movement thereof in the opposite direction, comprising a resilient element connected to said support and adapted to exert force varying with the contraction and expansion thereof; and force equalizing connections between said resilient element and pulley member for maintaining substantially uniform pressural engagement between the contacting surfaces of the belt and pulley, comprising an arm connected to the resilient element and to the pulley member, and a link connected to said arm and to said support, said connections being operable in all positions and throughout all movements of the pulley member to apply substantially uniform force thereto from the resilient element regardless of variations in the force exerted by the latter.

4. In a variable speed power-transmitting mechanism, a non-rotatable support; an expansible pulley journalled in said support, said pulley including an axially reciprocal conical member operable to vary the effective diameter of the pulley; a belt engaging said pulley; means for moving said pulley member in one direction and yieldably resisting movement thereof in the other direction, comprising a resilient element having one end connected to said support and adapted to exert force varying with its contraction and expansion; and means for maintaining substantially uniform pressural engagement between the contacting surfaces of the belt and pulley, comprising force equalizing connections including an arm having one end connected to the pulley member and its other end connected to the other end of said resilient element, and a link having one of its ends connected to said support and its other end connected to said arm intermediate the ends of the latter, said connections being operable in all positions and throughout all movements of the pulley member to apply substantially uniform force thereto from the resilient element regardless of variations in the force exerted by the latter.

HERMANN KLAUCKE.

REFERENCES CITED

The following references are of record in the file of this patent:

UNITED STATES PATENTS

| Number | Name | Date |
|---|---|---|
| 2,024,460 | Lewellen | Dec. 17, 1935 |
| 2,070,756 | Skelly | Feb. 16, 1937 |
| 2,079,351 | Judelshon | May 4, 1937 |
| 2,101,084 | Meyers | Dec. 7, 1937 |
| 2,112,157 | Hatcher | Mar. 22, 1938 |
| 2,226,236 | Bleam | Dec. 24, 1940 |
| 2,310,081 | Hill | Feb. 2, 1943 |
| 2,347,479 | Higgins | Apr. 25, 1944 |